(12) United States Patent
Ho

(10) Patent No.: US 6,948,331 B1
(45) Date of Patent: Sep. 27, 2005

(54) ENVIRONMENTAL CONTROL SYSTEM FOR AN AIRCRAFT

(75) Inventor: Yuhang Ho, Torrance, CA (US)

(73) Assignee: Norhrop Grumman Corporation, Los Angeles, CA (US)

( * ) Notice: Subject to any disclaimer, the term of this patent is extended or adjusted under 35 U.S.C. 154(b) by 46 days.

(21) Appl. No.: 10/660,973

(22) Filed: Sep. 12, 2003

(51) Int. Cl.$^7$ ................................................. F25D 9/00
(52) U.S. Cl. .............................. 62/401; 62/402; 62/434
(58) Field of Search ...................... 62/239, 181, 172, 62/332, 333, 402, 428, 430, 434; 244/118.5

(56) References Cited

U.S. PATENT DOCUMENTS

| | | | |
|---|---|---|---|
| 3,583,658 A | * | 6/1971 | Herweg .................... 244/118.5 |
| 4,263,786 A | | 4/1981 | Eng ................................ 62/87 |
| 4,273,304 A | * | 6/1981 | Frosch et al. ............. 244/117 A |
| 4,434,624 A | | 3/1984 | Cronin et al. .................. 62/172 |
| 4,487,034 A | | 12/1984 | Cronin et al. .................. 62/402 |
| 4,660,761 A | * | 4/1987 | Bussjager .................... 237/2 B |
| 4,773,473 A | * | 9/1988 | Konitzer ....................... 165/41 |
| 4,869,071 A | | 9/1989 | Wehner et al. ................. 62/133 |
| 5,058,390 A | | 10/1991 | Sindermann et al. ......... 62/181 |
| 5,131,238 A | * | 7/1992 | Meckler ....................... 62/271 |
| 5,369,960 A | * | 12/1994 | Mueller et al. ............. 62/238.6 |
| 5,545,084 A | | 8/1996 | Fischer et al. ................. 454/76 |
| 5,664,411 A | * | 9/1997 | Shao ........................... 60/776 |
| 5,899,085 A | * | 5/1999 | Williams ..................... 62/236 |
| 6,041,615 A | | 3/2000 | Ostersetzer et al. ........... 62/402 |
| 6,076,593 A | * | 6/2000 | Takagi et al. .................. 165/43 |
| 6,106,963 A | * | 8/2000 | Nitta et al. ................... 429/19 |
| 6,182,435 B1 | * | 2/2001 | Niggemann et al. .......... 60/772 |
| 6,658,881 B1 | * | 12/2003 | Plattner ....................... 62/239 |
| 6,663,044 B1 | * | 12/2003 | Munoz et al. ............ 244/118.5 |

FOREIGN PATENT DOCUMENTS

| | | | |
|---|---|---|---|
| JP | 11153362 A | * | 6/1999 |
| JP | 2000318695 A | * | 11/2000 |
| WO | PCT/US/98/14033 | | 1/1999 |

* cited by examiner

Primary Examiner—Mohammad M. Ali
(74) Attorney, Agent, or Firm—Louis L. Dachs

(57) ABSTRACT

An environmental control system for an aircraft includes a vapor cycle system for circulating a refrigerant through a fuel cooled condenser, a primary evaporator wherein the expanded refrigerant is used to provide cooling for a cooling medium and a secondary evaporator. An air cycle system is included having a compressor system for providing compressed air, a system to cool the compressed air, a system to expand the cooled and compressed air, a heat exchanger for receiving the expanded air to provide cooling for a cooling medium passed through the secondary evaporator of the vapor cycle system wherein the compressed air is cooled prior to expansion. A fuel to air heat exchanger located between the compressor system and the secondary evaporator of the vapor cycle system for receiving fuel after it is passed through the condenser of the vapor cycle system and cooling the compressed air from the compressor system.

8 Claims, 2 Drawing Sheets

ENVIRONMENTAL CONTROL SYSTEM FOR AN AIRCRAFT

BACKGROUND OF THE INVENTION

1. Field of the Invention

The invention relates to the field of environmental control systems for aircraft and, in particular, to a hybrid vapor cycle and air cycle environmental control system.

2. Description of Related Art

Conventional aircraft cooling system use either air cycle cooling system (ACS) or vapor cycle cooling system (VCS) to provide vehicle cooling. The vapor cycle system based on the conventional low temperature refrigerant such as R-134*a* is used in automobile applications may be used for low speed aircraft. The system is typically cooled by ram air but with the need for drag reduction, some systems are cooled by fuel. However, the fuel used for the cooling the system condenser has to be limited in a relative low temperature level such as lower than 140 degree F. The VCS has a higher coefficient of performance (COP) because the high level of latent heat change from liquid to vapor state. The COP is defined as the cooling capacity versus the work required by the system.

The air cycle cooling system in various configurations has been used for most of aircraft cooling design. Most ACS use ram air to cool the engine bleed air using a primary heat exchanger before it is compressed and then cooled by a ram air-cooled secondary heat exchanger after the air is compressed by a compressor. The cooled air then is expanded through the cooling turbine to produce low temperature cooling air for distribution in to the aircraft for equipment, subsystem, and cockpit. For aircraft designed for high. Mach number cruise, the conventional system uses fuel to cool the engine bleed air instead of using ram air because the ram air total temperature could be high and the ram air inlet increases drag. Significant safety pre-cautions have to be taken to mitigate the catastrophic failure that may occur if fuel leakage comes in contact with high temperature air. The ACS has a lower COP because of the high power required to compress air.

For high-speed flight, hybrid system conbining ACS and VCS has been used for ram air drag reduction and fuel heat sink temperature matching. In the prior art, the heat rejection from equipment is first sank into the VCS and then the heat rejection from VCS is transferred by the ACS and then dissipated into fuel and ram air. Because the ACS is inherently low in efficiency and it has to be designed to dissipate the cooling load and the work required by the VCS, there is a weight penalty. However, this approach is used because the VCS is more efficient in producing low temperatures using the phase change property of the refrigerant.

With advent of high power electronics, the cooling loads are greatly increased, which exacerbates the problem. The bleed air that can be extracted from the engine for high speed-high altitude flight is relatively low; otherwise engine performance is significantly reduced. For an ACS, primarily using bleed air, becomes a less attractive solution. In addition, with high-speed cruise at Mach 2+, the aerodynamic heating contributed to the fuel tank temperature increases significantly and the ram air total temperature is high. The system design described herein addressed these issues using unique integration and cooling loads partitioning approach.

Thus, it is a primary object of the. invention to provide an environmental control system for an aircraft.

It is another primary object of the invention to provide an environmental control system for an aircraft that is suitable for use in aircraft flying at very high velocities and high altitude.

It is a further object of the invention to provide an environmental control system for an aircraft that is a hybrid air cycle system and vapor cycle system.

SUMMARY OF THE INVENTION

The invention is an environmental control system for an aircraft. In detail, the invention includes a vapor cycle system (VCS) including a compressor to compress the refrigerant. A condenser, cooled by fuel, is connected to the compressor wherein the pressurized refrigerant is liquefied. Coupled to the condenser is a throttle valve wherein the compressed and cooled refrigerant is expanded further reducing the temperature thereof. A primary evaporator is connected to the throttle valve and receives the expanded refrigerant. The primary evaporator is coupled to a separate cooling system wherein a liquid medium is cooled by the expanded refrigerant. A secondary evaporator is connected to the primary evaporator receives the refrigerant from the primary evaporator and cools the compressed air from an air cycle system, in a manner to be subsequently discussed.

The invention further includes an air cycle system (ACS). The ACS includes a compressor system for providing compressed air. An air/fuel heat exchanger is coupled to the compressor system. The air/fuel heat exchanger receives fuel from the condenser of the VCS and cools the compressed air. The fuel is than passed to the engine and consumed. The secondary evaporator of the VCS is coupled to the air/fuel heat exchanger and receives the now partially cooled and compressed air and further cools the air by means of the refrigerant passing there through. Thereafter the further cooled compressed air is directed through a recuperate heat exchanger, a heat exchanger for moisture condensing, and through a water separator. A turbine, which drives a generator, is coupled to the water separator. As the compressed air drives the turbine it expands and is further cooled. It then passes through a final stage heat exchanger providing cooling and to the cockpit and a cooling heat exchanger for a separate cooling system for avionics. The expanded air then passes through the recuperate heat exchanger (providing cooling therefore) and is coupled to the inlet of the compressor where the air is recycled.

The innovation is the use of the air/fuel heat exchanger to initially cool the compressed air and the coupling of the secondary evaporator of the VCS there to for additional cooling of the pressurized air.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1A:
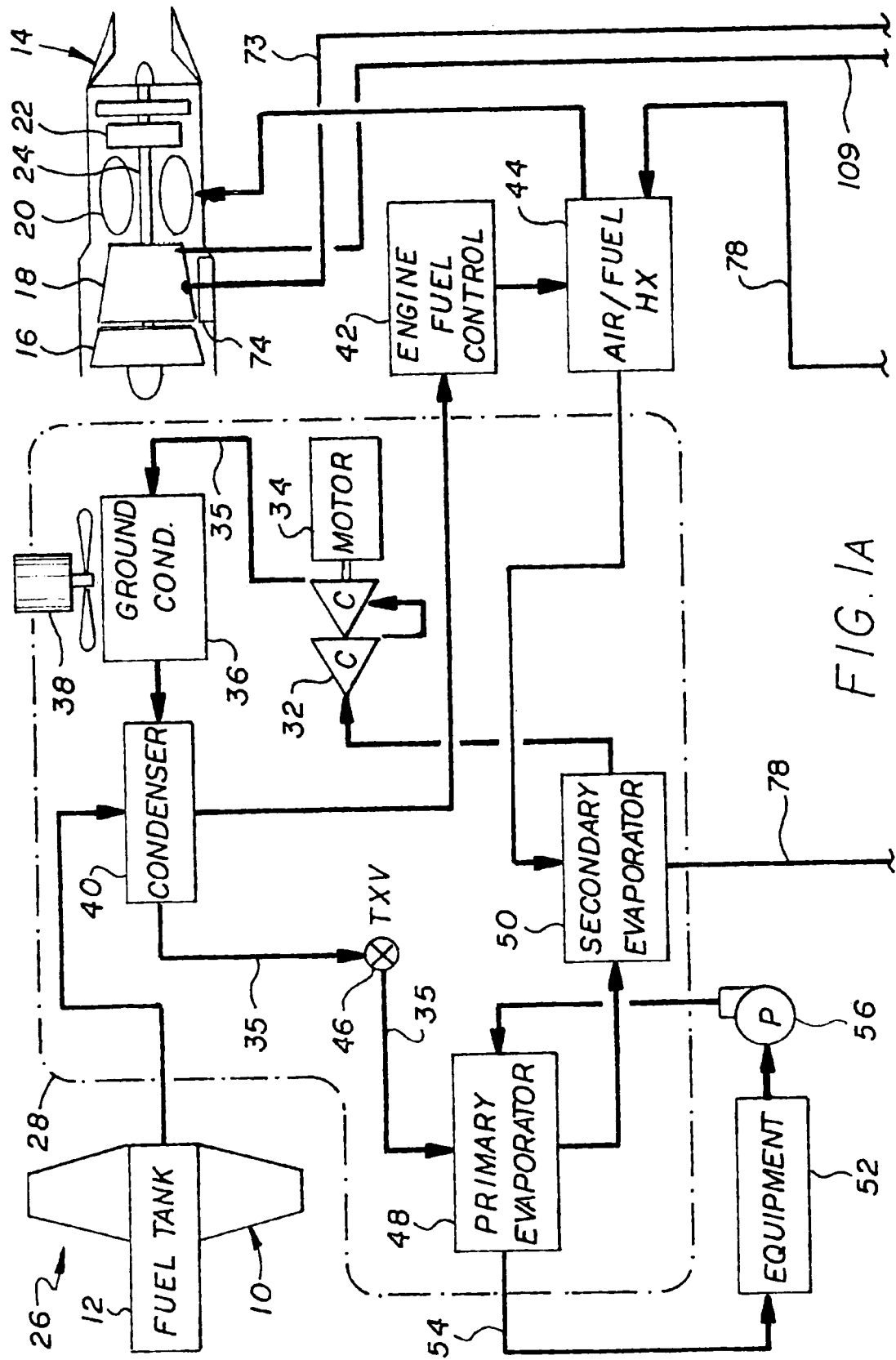
FIG. 1A is a first half of a schematic of the environmental control system.
Figure 1B:
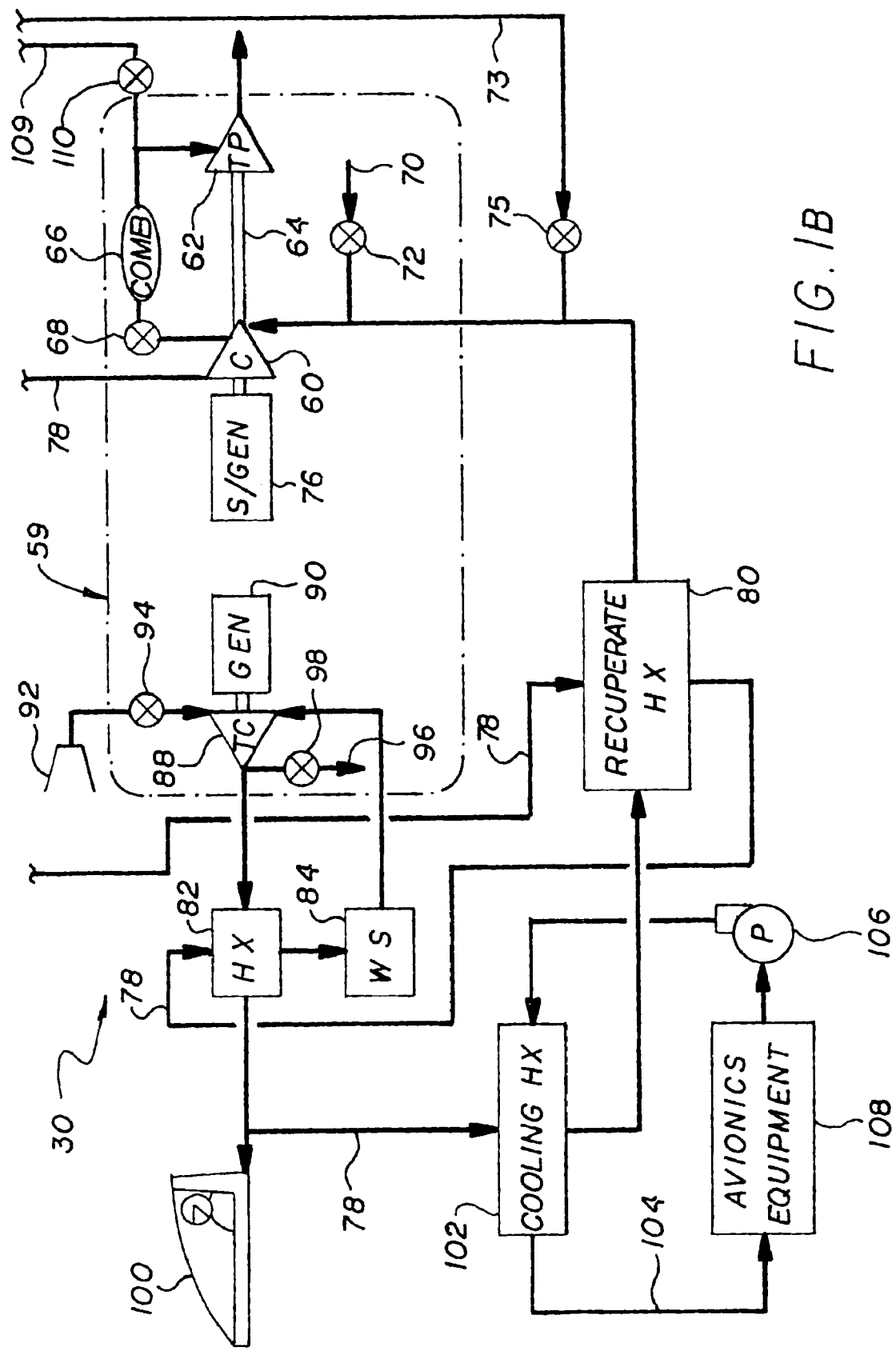
FIG. 1B is a second half of the schematic sown in FIG. 1A

Referring to FIG. 1 an aircraft 10, including a fuel tank 12 and a jet engine 14. The jet engine 14 includes a fan 16, compressor section 18, combustion section 20 and turbine section 22 for driving the fan and compressor section through a drive shaft assembly 24. The environmental control system, generally indicated by numeral 26 includes a vapor cycle system 28 and an air cycle system 30 that are coupled together.

The vapor cycle system 28 includes a compressor assembly 32 driven by electric motor 34. The compressor assembly 32 compresses a refrigerant (not shown) where the temperature pressure their of is raised. The refrigerant then passes into a flow path 35 to a ground-cooling condenser 36, for use when the aircraft's engine 14 is off and no fuel is flowing. The refrigerant is cooled by a fan 38. The ground-cooling condenser 36 is coupled to a condenser 40 wherein the refrigerant is cooled while still at high pressure. When the engine 14 is running, cooling is provided by fuel from the aircraft's fuel tank 12 which passes through the condenser 40 to a engine fuel control 42 through a high pressure/high temperature heat exchanger 44 and into the combustion section 20 of the engine.

The refrigerant passes from the condenser 40 and exits as a liquid. The refrigerant then continues on the flow path 35 through a throttle valve 46, where the refrigerant is expanded to a vapor state causing a further drop in the temperature. The refrigerant, continuing on the flow path 35, then passes through a primary evaporator 48, secondary evaporator 50 and then returns to the compressor assembly 32. Cooling of equipment 52 is accomplished by a cooling loop 54. The cooling loop 54 includes a pump 56, which circulates a cooling liquid through the primary evaporator 48, where it is cooled, and thereafter through the equipment 52.

The air cycle system (ACS), 30 includes an integrated power and cooling unit (IPCU) 59 that comprises a compressor 60 coupled to a turbine 62 by shaft 64 having a combustion section 66 there between. A valve system 68 controls the flow of air from the compressor to the combustion section 60. An air inlet 70 provides ambient air to the compressor 60. A valve 72 in the air inlet 70 controls airflow there through. The compressor 60 is also coupled to the compressor section 18 of the engine 14 via flow path 73 with flow there through a fan duct heat exchanger 74 cooled by fan air and controlled by valve 75. A starter/generator 76 is coupled to the shaft 64. Thus the Starter/generator 76 in the starter mode can be used to start the IPCU, or once the IPCU is started it can drive the starter/generator in the generator mode.

When the IPCU 59 is operating in the normal cooling mode, air from the compressor section 18 of the engine 14 is directed to the compressor 60 of the IPCU controlled by a valve 75. A flow path 78 connects compressor 60 is coupled to the heat exchanger 44. The compressed air continues along flow path 78 through the secondary evaporator 50, wherein it is further cooled. The flow path 78 continues to recuperate heat exchanger 80 to be cooled by the recirculating air, to heat exchanger 82, water separator 84 and to turbine 88, which drives generator 90. A ram air inlet 92 is coupled to the turbine 88 with the flow controlled by valve 94. An over board exhaust line 96 having control valve 98 therein is also coupled to the turbine 88. The output from the turbine 88 continues along flow path 78 through the heat exchanger 82 to the cockpit 100 and to cooling heat exchanger 102. Thereafter the flow path 78 passes through recuperate heat exchanger 80 and back to the compressor 60. A second cooling loop 104 includes a pump 106 that circulates cooling media such as ethylene glycol water (EGW) or polyalpholephin (PAO) through the cooling heat exchanger 102 and avionics equipment 108.

Having described the various components of the system, following is a description of the operation thereof. During the IPCU starting mode, when valves 75 is closed, valve system 68 and 72 are open, and starter/generator 76 is in the starter mode, the IPCU 59 can be started when fuel is injected into the combustion section 66 and ignited. After light off, the hot gas exits from the combustor 66 and drives the turbine 62. The turbine 62 then drives the compressor 60. After the IPCU has been started, the starter/generator 76 can be switched to the generator mode providing electrical power. When the IPCU 59 is operating in normal cooling mode, the starter/generator 76 is in the motoring mode, valves 72 and 68 are closed, valve 75 is open. Thus bleed air from the engine transferred by flow path 73 can be further compressed by the compressor 60 and fed to the heat exchanger 44 where the air is cooled by the fuel passing there through and on to the engine. Thereafter the air passes through the secondary evaporator 50 where it is further cooled. The air passes through the recuperate heat exchanger 80, passes to heat exchanger 82 to water separator 84 and to Turbine 88.

At this point valves 98 and 94 are closed and the compressed air drives turbine 88, which in turn drives generator 90. The power generated is used to drive the starter/generator 76 now in motoring mode. As the air drives turbine 88, it expands and cools. It then passes though heat exchanger 82 cooling the air from the recuperate heat exchanger 80 and then passes into the cockpit 100 and cooling heat exchanger 102. A cooling loop 104, having a pump 106 therein circulates a cooling medium through the heat exchanger 102 for cooling avionics equipment 108. The air then passes through recuperate heat exchanger 80 where it cools air from the secondary evaporator 50 and then returns to compressor 60 mixing with make up air from the compressor section 18 of the engine 14.

Should the engine 14 fail, the valves 94 and 98 are opened and ram air enters and drives the turbine 88 A ram air inlet 92 having a control valve 94 for controlling airflow there through is coupled to the turbine 88 A turbine exhaust port 96 having a control valve 98 mounted therein, dumps the exhaust from the turbine 88 overboard. The electrical power generated by generator 90 in this engine 14 failure mode is used to power the aircraft system emergency loads.

In the VCS, after the engine has been started and fuel is flowing, the motor 34 drives the compressor assembly 32, which provides refrigerant to the ground-cooling condenser 36 cooled by fan 38 to a liquid state on the ground. In flight, the refrigerant passes through condenser 40. The refrigerant passes the throttle valve 46 where it expands it into a vapor and it passes through the primary evaporator 48 and secondary evaporator 50 and back to the compressor assembly 32. The pump 56 in the first cooling loop 54 passes cooling media such as EGW or PAO through the primary condenser 48. Thereafter the air is transferred to the equipment 52 cooling same and thereafter circulates back to pump 56.

If the main generator failed, engine bleed air through flow path 109 is used to drive the power turbine 62 through valve 110 now is open. The compressor 60 and starter/generator 76 are driven to compress air and generating electrical power. Power generated from the generator 90 driven by the cooling turbine 88 is used to power the aircraft electrical power system.

Before the engine is started, there is no fuel flowing. The cooling system including ACS 30 and VCS 28 are powered by ground electrical power. Valve 68 and 75 are closed and valve 72 is open. Air is circulated by the compressor 60 driven by the starter/generator 76 in motoring mode. The ACS heat is transferred to the VCS through the secondary evaporator 50. The compressor of the VCS 28 is driven by the motor 34 driven by electrical ground power. Since there is no fuel flow through the condenser 40, the VCS heat is removed through the ground cooling heat exchanger 36 by the air blowing from the ground cooling fan.

The uniqueness of this design is the integration of VCS and ACS to form an efficient cooling system and the use of high temperature refrigerant for sinking heat into fuel at a relatively high temperature. The system is also unique in providing low and mid-temperature cooling partition that can be partitioned to match the system heat loads. By load partitioning and system integration, the ACS does not have to be designed for the total heat loads thus enables a lower volume system that is typically a problem of the ACS.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. An environmental control system for an aircraft comprising;
   a vapor cycle system including a compressor wherein a refrigerant is compressed, a condenser wherein the refrigerant is liquefied, a throttle valve wherein the compressed and cooled refrigerant is expanded further reducing the temperature thereof, a primary evaporator wherein the expanded refrigerant is used to provide cooling to a cooling medium, and a secondary evaporator for receiving refrigerant from said primary evaporator;
   an air cycle system having compressor means for providing compressed air, means to cool the compressed air, means to expand the cooled and compressed air, means to expand the compressed and cooled air further reducing its temperature, a heat exchanger for receiving the air to provide cooling for a second cooling medium;
   an air to fuel heat exchanger located between said compressor means and said secondary evaporator of said vapor cycle system for receiving fuel after the fuel has passed through said condenser of said vapor cycle system and cooling the compressed air from said compressor means; and
   means to pass the pressurized air from said fuel to air heat exchanger to said secondary evaporator.

2. The environmental control system as set forth in claim 1 wherein the fuel passes through the said condenser to cool the refrigerant prior to reaching said fuel to air heat exchanger.

3. The environmental control system as set forth in claim 2 wherein the fuel is directed to an engine of the aircraft after exiting said fuel to air heat exchanger.

4. The environmental control system as set forth in claim 3 further comprising a turbine for expanding the air prior to the air providing cooling for said second medium.

5. An improvement to an environmental control system for an aircraft including a vapor cycle system having a primary evaporator and an air cycle system including a compressor coupled to at least one air to air heat exchanger, the improvement comprising;
   a secondary evaporator coupled in series to said primary evaporator;
   an air to fuel heat exchanger wherein the air is cooled by fuel; and
   means to couple said compressor to said air fuel heat exchanger and to said secondary evaporator prior the compressor and at least one air to air heat exchanger.

6. The environmental control system as set forth in claim 5 wherein the fuel passes through the said condenser to cool the refrigerant prior to reaching said fuel to air heat exchanger.

7. The environmental control system as set forth in claim 6 wherein the fuel is directed to an engine of the aircraft after exiting said fuel to air heat exchanger.

8. The environmental control system as set forth in claim 3 further comprising a turbine for expanding the air prior to the air providing cooling for said second medium.

* * * * *